US007311601B2

(12) United States Patent
Anderson et al.

(10) Patent No.: US 7,311,601 B2
(45) Date of Patent: Dec. 25, 2007

(54) GAMING MACHINE HAVING MANUFACTURER-LIMITED GAMING PARAMETER VALUES SELECTABLE BY AN OPERATOR DURING GAMING MACHINE SET-UP

(75) Inventors: Peter R. Anderson, Chicago, IL (US); Brandon C. Estes, Chicago, IL (US); Christian P. Gyrling, Chicago, IL (US); William A. Hoefferle, Crystal Lake, IL (US); Shridhar P. Joshi, Skokie, IL (US)

(73) Assignee: WMS Gaming, Inc., Chicago, IL (US)

( * ) Notice: Subject to any disclaimer, the term of this patent is extended or adjusted under 35 U.S.C. 154(b) by 649 days.

(21) Appl. No.: 10/650,423

(22) Filed: Aug. 28, 2003

(65) Prior Publication Data

US 2005/0049037 A1 Mar. 3, 2005

(51) Int. Cl.
*A63F 13/00* (2006.01)

(52) U.S. Cl. ............................ 463/20; 463/23; 463/25; 463/29

(58) Field of Classification Search .................. 463/23, 463/29, 16, 20, 25
See application file for complete search history.

(56) References Cited

U.S. PATENT DOCUMENTS 6,468,156 B1 * 10/2002 Hughs-Baird et al. ........ 463/25
6,884,173 B2 * 4/2005 Gauselmann ................ 463/42
2003/0119579 A1 * 6/2003 Walker et al. ................ 463/20
2003/0195031 A1 * 10/2003 O'Donovan et al. .......... 463/16

* cited by examiner

*Primary Examiner*—Ronald Laneau
*Assistant Examiner*—Ross A. Williams
(74) *Attorney, Agent, or Firm*—Nixon Peabody LLP

(57) ABSTRACT

The invention provides a gaming machine having manufacturer-limited parameter values or parameter value combinations selectable by an operator during gaming machine set-up. The parameter values preferably include different maximum pay lines associated with different denominations and are limited to those which have been determined by the manufacturer to provide optimum game play. The different maximum pay lines may be associated with different math models having substantially the same payback percentage values. Subsequent operator selection of the parameter values during gaming machine therefore setup allows the gaming machine having a single game theme or a gaming machine having multiple game themes to be configured with different maximum pay lines for each single game theme. As a result, the player can play a single theme wagering game with a first maximum pay line value and with a second maximum pay line value where the second maximum pay line value differs from the first maximum pay line value.

16 Claims, 15 Drawing Sheets

GAMING MACHINE HAVING MANUFACTURER-LIMITED GAMING PARAMETER VALUES SELECTABLE BY AN OPERATOR DURING GAMING MACHINE SET-UP

FIELD OF THE DISCLOSURE

This invention is directed to gaming machines, and more particularly, to a gaming machine having manufacturer-limited parameter values selectable by an operator during gaming machine set-up.

BACKGROUND

Gaming machines providing games such as electronically driven games including video slot, video poker, video black-jack, video keno, video bingo, video pachinko, video lottery, and mechanically spinning reel slot games, etc., are well known in the gaming industry. Also well known, is the fact that preventing cheating and ensuring fair play of the games are crucial to the gaming industry. As a result, in virtually all jurisdictions, there are varied but stringent regulatory restrictions regarding gaming machine configurations, including gaming parameters and software, and gaming machine security. Accordingly, upon deliver and installation of a gaming machine, an operator (e.g., a casino operator) is required to follow regulated set-up procedures prior to enabling gaming machine play.

Because current gaming machines typically provide gaming software via non-volatile memory (e.g., electronically erasable programmable read only memory (EEPROMs), battery-backed non-volatile static access random access memory (NVRAM), etc.), the set-up procedure begins with a “RAM clear” to erase information stored within the non-volatile memory. The RAM clear is generally executed by an operator technician using a specialized RAM clear compact flash (or similar memory device) and an administrator touch screen display provided on the gaming machine. Performance of the RAM clear ensures that the gaming machine is configured in a known state prior to loading values for critical, one-time settable game configuration parameters such as pay table percentages, coin acceptor/hopper denomination, pay line selection options, gaming machine serial number, ticket printer enable and type, SAS protocol number, etc. Upon completion of the RAM clear, the game configuration parameters and associated parameter values defining game play are selected by the operator and the operating system software and gaming software are installed in the gaming machine.

Typically, the operator has flexibility in selecting and combining some, but not all of the individual parameter values for gaming machine set-up. For example, in the case of a slot machine offering one game theme having multiple game denominations, the operator may have an option to combine each of the game play denomination values with multiple payback percentages but with only one maximum pay line value (e.g. 9 maximum pay lines). Thus, each game play denomination is associated with the same maximum pay line value (e.g., a $0.01 game denomination associated with a 91% payback percentage and with a 9 maximum pay line value, a $0.25 game denomination associated with a 94% payback percentage and with a 9 maximum pay line value, etc). This is due in part to the fixed configuration of traditional mechanical button panels having, for example a 1 maximum pay line button, a 3 maximum pay line button, a 5 maximum pay line button, a 7 maximum pay line button and a 9 maximum pay line button. As a result, the operator does not have the flexibility to provide the player with different gaming experiences (via different probability tables) on a single themed gaming machine having multiple game denominations because, although the operator can select from among varying payback percentages, the operator cannot select from among varying the maximum pay line values during gaming machine set-up.

Further, if the available parameter values are improperly selected by the operator, the resulting parameter value combinations may give rise to a poor game play experience for the player and therefore yield lower revenues for the operator. For example, in the case of a slot machine offering a single themed game having multiple game denominations, the operator may combine selected parameters values to configure the slot game with a 3 maximum pay line value, a $0.01 game denomination and a 94% payback percentage from among a $0.01, a $0.05, and a $0.25 game denomination, a 3, a 5, or a 9 maximum pay line value, and a 92%, a 94%, and a 96% payback percentage. That is, the operator selects one parameter value combination out of a possible 27 parameter value combinations. As a result of the selection of a low denomination (i.e., $0.01) in combination with the low maximum number of pay lines (i.e. the 3 maximum pay line value), the game play experience may not be optimal from the player's perspective and the gaming machine therefore, may yield a low revenues for the operator.

SUMMARY OF THE INVENTION

A gaming machine having manufacturer-limited parameter values or parameter value combinations selectable by an operator during gaming machine set-up is disclosed herein. The gaming machine may provide single-themed game play or multiple-themed game play. The parameter values or parameter value combinations provided are limited to those which have been determined by a manufacturer of the gaming machine to provide optimum game play based on market research and player feedback. The manufacturer-limited parameter values or parameter value combinations are preferably grouped together for operator selection based on different game denomination values for single-themed game play however they may also be grouped together based on other game play characteristics. In addition, the manufacturer-limited parameter values or parameter value combinations selectable by the operator allow the gaming machine having a single game theme or a multiple game theme (encompassing multiple single game themes) to be configured with different maximum pay lines for each single game theme. As a result, multiple maximum pay line configurations are available to a player of the gaming machine. Thus, by selecting different denominations during game play, the player can invoke different probability tables to vary the gaming experience. Further, selecting from among the manufacturer-limited parameter values or parameter value combinations, the operator can configure single game theme play on the gaming machine to generate the same payback percentage over time, even when different mathematical models are used. Achieving the same payback percentage despite using different mathematical models is enabled by, for example, operator selection of multiple different maximum pay line values, multiple different probability tables, or other multiple different math parameter values.

In an embodiment, using an interactive configuration screen provided on a video display of the gaming machine during gaming machine set-up, the operator chooses a first game denomination value from among a number of possible game denominations values for a single game theme. In response, a first plurality of different manufacturer-limited parameter values or parameter value combinations associated with the first denomination value is displayed to the operator via the interactive configuration screen. The first plurality of different manufacturer-limited parameter values displayed to the operator for the first denomination value differs from a second plurality of different manufacturer-limited parameter values displayed in response to subsequent operator selection of a second denomination value from among the number of possible game denominations values. The operator then selects a first manufacturer-limited parameter value from those displayed in the first plurality of different manufacturer-limited parameter values. The gaming machine is configured based on the first manufacturer-limited parameter value. Similarly, the gaming machine is additionally configured based on a second manufacturer-limited parameter value selected from the second plurality of different manufacturer-limited parameter values, and so on.

For a video slot game play, each of the plurality of manufacturer-limited parameters values or manufacturer-limited parameter value combinations preferably include different maximum pay line values paired with different payback percentage values. Each of the plurality of manufacturer-limited parameters values or manufacturer-limited parameter value combinations however, may also include any logically grouped game parameter value combinations. In addition, besides game denomination values, each plurality of manufacturer-limited parameters values or manufacturer-limited parameter value combinations may be associated with other game play parameters such as math models and probability tables.

In another embodiment, the invention provides a method for configuring a gaming machine using an interactive configuration screen based on different game denomination values. The method includes displaying a first plurality of maximum pay line values for a single game theme, detecting an operator selection of a first maximum pay line value from the first plurality of maximum pay line values, and configuring game play of the gaming machine based on the first maximum pay line value. The first plurality of maximum pay line values is displayed in response to operator selection of a first denomination value from a plurality of denomination values displayed on the interactive configuration screen. The method further includes displaying a second plurality of maximum pay line values in response to operator selection of a second denomination from the plurality of denomination values, detecting operator selection of a second maximum pay line value from the second plurality of maximum pay line values, and configuring game play of the gaming machine based on the second maximum pay line value. Each of the first plurality of maximum pay line values is determined by a manufacturer of the gaming machine to provide optimum game play utilizing the first denomination value and each of the second plurality of maximum pay line values is determined by the manufacturer to provide optimum game play utilizing the second denomination value. In one embodiment, at least one of the second plurality of maximum pay line values differs from at least one of the first plurality of maximum pay line values. The method additionally includes detecting selection of a save indication displayed on the interactive configuration screen, causing a player selectable mechanical button of the gaming machine to correspond to the first maximum pay line value during game play by a player utilizing the first denomination value, and causing the player selectable mechanical button to correspond to the second maximum pay line value during game play by the player utilizing the second denomination value. As a result, the player can play a single theme wagering game with a first maximum pay line value and with a second maximum pay line value where the second maximum pay line value differs from the first maximum pay line value.

In yet another embodiment, the invention provides a method for configuring a gaming machine using an interactive configuration screen based on different math models. The method includes displaying a plurality of different math models for a single game theme of the gaming machine where the plurality of different math models have substantially the same payback percentage values, receiving a first selection from an operator of a first math model from the plurality of different math models, and configuring game play of the gaming machine based on the first selection. The plurality of different math models includes respective different maximum pay line values.

The method also includes displaying a second plurality of different math models for the single game theme, the second plurality of different math models having substantially the same payback percentage values, the second plurality of different math models including respective different maximum pay line values, receiving a second selection from the operator of a second math model from the second plurality of different math models, and configuring game play of the gaming machine based on the second selection.

Additional aspects of the invention will be apparent to those of ordinary skill in the art in view of the detailed description of various embodiments, which is made with reference to the drawings, a brief description of which is provided below.

DESCRIPTION OF THE PREFERRED EXAMPLES

Figure 1:
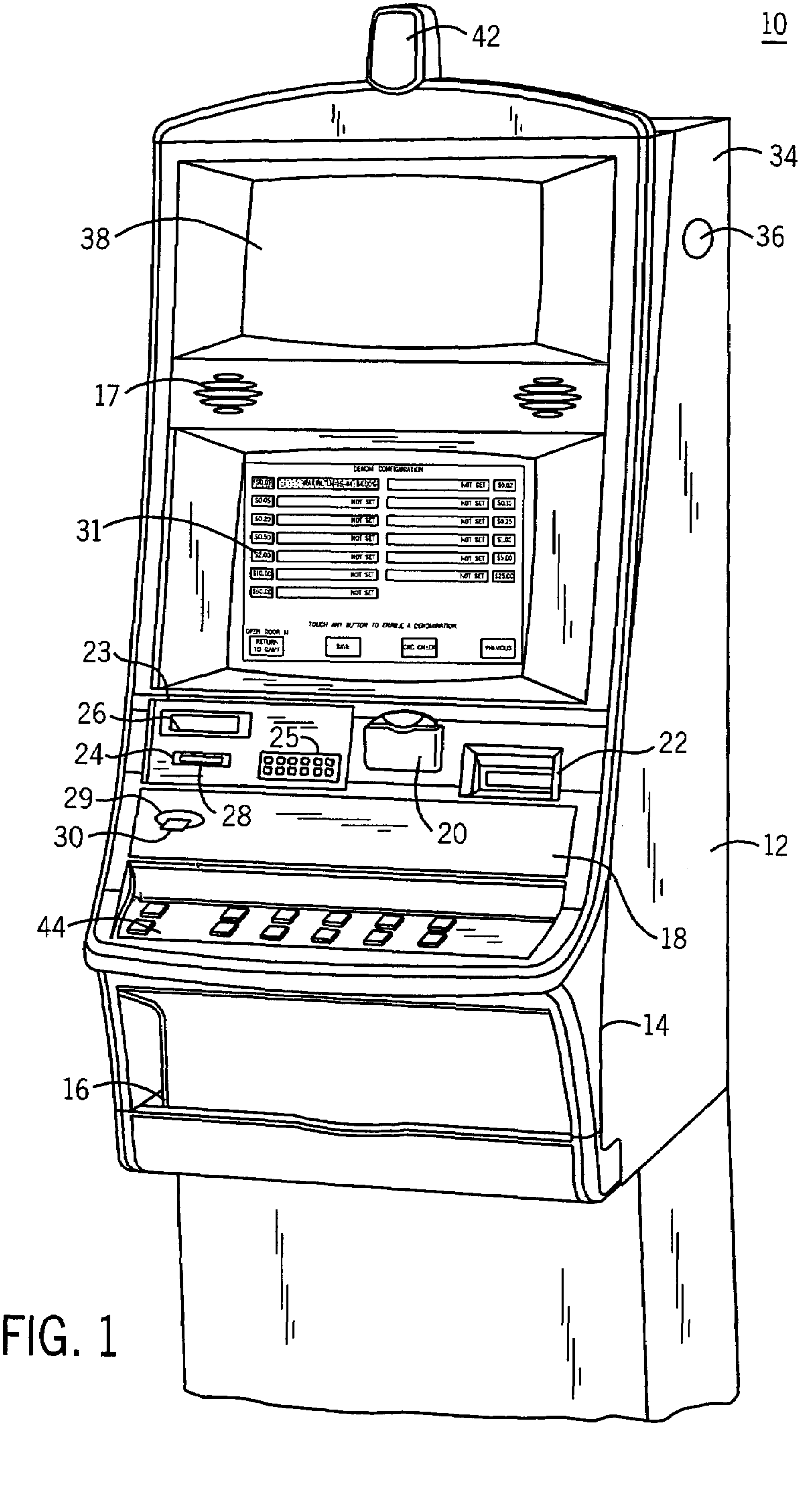
FIG. 1 is a perspective view of an embodiment of a gaming machine having gaming machine manufacturer-limited parameter values selectable by an operator during gaming machine set-up in accordance with the invention.

The description of the preferred examples is to be construed as exemplary only and does not describe every possible embodiment of the invention. Numerous alternative embodiments could be implemented, using either current technology or technology developed after the filing date of this patent, which would still fall within the scope of the claims defining the invention.

In general, a gaming machine having manufacturer-limited parameter values or parameter value combinations selectable by an operator during gaming machine set-up is disclosed herein. The parameter values or parameter value combinations provided are limited to those which have been determined by a manufacturer of the gaming machine to provide optimum game play based on market research and player feedback. The manufacturer-limited parameter values or parameter value combinations are preferably grouped together for operator selection based on different game denomination values however they may also be grouped together based on other game play characteristics. In addition, the manufacturer-limited parameter values or parameter value combinations selectable by the operator allow the gaming machine having a single game theme or a multiple game theme to be configured with different maximum pay lines for each single game theme. As a result, multiple maximum pay line configurations are available to a player of the gaming machine. Thus, by selecting different denominations during game play, the player can invoke different probability tables to vary the gaming experience. Further, selecting from among the manufacturer-limited parameter values or parameter value combinations, the operator can configure the gaming machine having a single game theme or a multiple game theme to generate the same payback percentage over time, even when different mathematical models are used.

More specifically, using an interactive configuration screen during gaming machine set-up, the operator chooses a first maximum pay line value from a first plurality of maximum pay line values displayed on the interactive configuration screen. Game play is then configured based on the first maximum pay line value. The first plurality of maximum pay line values is preferably displayed in response to operator selection of a first denomination value from a plurality of denomination values displayed on the interactive configuration screen. Each of the first plurality of maximum pay line values is determined by a manufacturer of the gaming machine to provide optimum game play by a player utilizing the first denomination value. The method further includes displaying a second plurality of maximum pay line values in response to operator selection of a second denomination from the plurality of denomination values, detecting operator selection of a second maximum pay line value from the second plurality of maximum pay line values, and configuring game play of the gaming machine based on the second maximum pay line value. Upon detecting operator selection of a save indication displayed on the interactive configuration screen, the gaming machine is “permanently” configured causing a player selectable mechanical button of the gaming machine to correspond to the first maximum pay line value during game play by a player utilizing the first denomination value, and causing the player selectable mechanical button to correspond to the second maximum pay line value during game play by the player utilizing the second denomination value. Thus, although a number of different game denominations may be provided for game play on the gaming machine, player selection of the player selectable mechanical buttons yields the maximum pay line value associated with the operator selected maximum pay line value for each of the different game denominations. As a result, by selecting different denominations, the player can invoke different probability tables during game play to vary the gaming experience.

As described below, the present invention is preferably implemented in a video slot machine. It is contemplated that the present invention may also be implemented in other types of video gaming machines or in a mechanical spinning reel slot machine having a video display screen or touch screen suitable for displaying the various gaming machine set-up screens to the operator.

An advantageous feature of limiting the parameter values available to an operator in accordance with the invention is that the maximum pay line configurations and payback percentages are limited to those determined to be most favorable for a selected game denomination. Another advantageous feature of limiting the parameter values in accordance with the invention is automatic mapping of the operator selected maximum pay line configurations and payback percentages into player selectable mechanical buttons on the gaming machine where the maximum pay line configurations and payback percentages vary between the different game denominations. Thus, game play is optimized for each denomination value, player satisfaction is increased, and revenues for the gaming machine operator are increased.

A further advantageous feature of providing a variety of maximum pay line configurations for a single-themed gaming machine in accordance with the invention is a varied game experience for the player. Because different maximum pay line configurations are associated with different game denominations via operator selection of the manufacturer-limited parameter values, the player can invoke different probability tables to vary the gaming experience simply by selecting different game denomination values. Thus, the player is no longer restricted to only one maximum pay line configuration for single themed slot machines. In addition, the operator can configure the single-themed gaming machine to generate the same payback percentage over time, even when different mathematical models are used.

FIG. 1 is a perspective view of one possible embodiment of a gaming machine 10 having a manufacturer-limited number of operator selectable parameter values or parameter value combinations available for gaming machine set-up in accordance with the invention. The operator selectable parameter values or parameter value combinations include varied maximum pay line configurations. The gaming machine 10 is preferably configured as a video slot game but may be any type of wagering gaming machine having a video display screen suitable for displaying gaming machine set-up screens to the operator. For example, the gaming machine 10 may be a video slot machine configured to play a single-themed slot game or it may be a mechanical spinning reel slot machine having a video display screen or touch screen suitable for displaying the various gaming machine set-up screens to the operator, and so on. For exemplary purposes, various elements of the gaming machine 10 are described below, but it should be understood that numerous other elements may exist and may be utilized in any number of combinations to create a variety of gaming machine types.

Referring to FIG. 1, the gaming machine 10 includes a cabinet 12 having a door 14 to provide access to the interior of the gaming machine 10. Attached to the door 14 are audio speaker(s) 17 and a belly glass area 18 that typically displays game theme artwork. The audio speaker(s) 17 may be used to generate a variety of sounds such as the sound of spinning slot machine reels, a dealer’s voice, music, announcements or any other audio related to the wagering game.

Also attached to the door 14 are a number of value input devices that allow a player to insert value for game play. The value input devices may include a coin slot acceptor 20 or a note acceptor 22 to input value to the gaming machine 10. The note acceptor 22 may accept value in any number of forms, including currency or a currency-sized paper ticket voucher inscribed with information such as a bar code representing value, the name of the casino, the date, etc. As used herein, the term “value” may encompass gaming tokens, coins, paper currency, ticket vouchers, credit or debit cards, optical cards, integrated circuit cards (e.g., a smart card), and any other object representative of value.

The gaming machine 10 may also include a player tracking area 23 having a card reader 24, a keypad 25 and a display 26. As will be appreciated by those of ordinary skill in the art, the player tracking area 23 may be located in any number of areas of the gaming machine 10. The display 26 may be implemented using a vacuum fluorescent display (VFD), a liquid crystal display (LCD), an LED display, and/or a touch screen to display information to a game player or casino employee. The card reader 24 may include any type of card reading device, such as a magnetic card reader, integrated circuit card reader or an optical card reader. The card reader 24 may be used to read data from a card (e.g., a credit card, a player tracking card, a smart card, etc.) offered by a player. If provided for player tracking purposes, the card reader 24 may be used to read data (e.g., a player's identity information) from, and/or write data to, cards capable of storing data. Such data may include the identity of a player, the identity of a casino, the player's gaming habits, etc. Once gathered, the data can be "mined" (i.e., the data is sorted to identify patterns and establish relationships) for any number of purposes including administering player awards, distinguishing player preferences and habits, accounting, etc.

The gaming machine 10 also includes a main display device 31 configured with a video display for displaying a number of operator set-up screens (e.g., administrator or "admin" screens) prior to enabling game play and for displaying video game images (e.g., simulated reel symbols in the case of a slot game, simulated cards, simulated numbers, etc.) during game play. Such a video display may be implemented as a CRT, an LCD, a plasma display, or other type of video display suitable for use in a gaming machine, and may be configured with or without a touch screen. For example, in a video gaming machine offering a slot game, the main display device 31 may include an LCD-TFT display displaying a symbol array of artwork and blank symbols with pay line configurations.

Although the main display device 31 in the illustrated example is displaying one of a number of operator set-up screens available during gaming machine set-up, additional operator set-up screens are included in the gaming machine 10 (e.g., screen shots described in connection with FIGS. 4-14). The main display device 31 may also configured to provide a player touch screen to enable player selections, player identification, and/or any other suitable information such as player instructions, etc. In addition, the main display device 31 may display animation, 2-D images, 3-D images or digital video playback, to name a few.

Referring again to FIG. 1, the gaming machine 10 may also include a top box 34 having additional speaker(s) 36 and a top box display device 38. Although not separately illustrated, the top box may also include a camera, a microphone, and/or a displayed mechanical device. The top box display device 38 may enable a number of game enhancements such as bonus games, interactive tournament games, progressive jackpot games, etc. In the case of a mechanical spinning reel slot machine, the top box display device 38 may be a static display configured to display award information such as pay tables via glass art.

The gaming machine 10 may also include a player control panel 44. The player control panel 44 may be provided with a number of mechanical pushbuttons or touch-sensitive areas (i.e., touch screen) that may be pressed by a player to select games, make wagers, make gaming decisions, etc. As used herein, the term "button" is intended to encompass any device that allows a player to make an input, such as a mechanical input device that must be depressed to make an input selection or a display area that a player may simply touch.

In the illustrated example, the player control panel 44 includes (1) a number of mechanical wager selection buttons that allow a player to specify a wager amount for each pay line selected (via selecting multiplier amounts of the game denomination) and (2) a number of mechanical pay line selection buttons that allow the player to select one of a number of possible of pay line configuration selections prior to spinning the video reels. All but one of the mechanical wager selection buttons is configured as a credit multiplier (e.g., 1 credit, 3 credits, 5 credits, etc.) which, when selected, causes an amount equivalent to the game denomination multiplied by the credit multiplier reflected on the selected mechanical wager button to be wagered. The remaining mechanical wager selection button is configured as a "Max Credit" button which, when selected by the player, causes the maximum credits allowable to be wagered for the game. The maximum credits allowable for game play is determined during the gaming machine set-up process described in connection with FIGS. 3-14. If the player desires to wager an amount available but not reflected by one of the mechanical wager buttons, the player may have an option to select the desired wager amount from a touch screen provided on the gaming machine 10, for example, a touch screen provided by the main display device 31.

Similarly, all but one of the mechanical pay line selection buttons is configured as a pay line multiplier (e.g., 1 line, 3 lines, 5 lines, etc.) which, when selected by the player, cause the number of pay lines reflected on the mechanical pay line selection button to be activated during slot game play. The remaining mechanical pay line selection button is configured as a "Max Line" button which, when selected by the player, causes the maximum number of pay lines allowable to be activated during game play. The maximum number of pay lines allowable is determined during the gaming machine set-up process described in connection with FIGS. 3-14. If the player desires to select a number of pay lines available but not reflected on one of the mechanical pay line selection buttons, the player may have an option to select the desired number of pay lines from a touch screen provided on the gaming machine 10.

The gaming machine 10 may also include one or more "Bet" buttons for wagering, a "Max Bet" button for making the maximum wager allowable (e.g., max credits and max pay lines) for the game, a "Play" button for beginning pay, a "Repeat" button for repeating the previous wagering selection, a "Collect" button for terminating play and cashing out of the game, a "Help" button for viewing a help screen, a "See Pays" button for causing the main display device 31 to generate one or more display screens showing the odds or payback information for the game or games provided by the gaming machine 10, and a "Call Attendant" button for calling an attendant. Further, although the control panel 44 is shown to be separate from the main display device 31, it should be understood that the control panel 44 could be generated by the main display device 31 as a touch-sensitive screen.

In the illustrated example, when a player inserts value in the gaming machine 10, a number of credits corresponding to the amount deposited are shown on a credit meter for example of the gaming machine 10. After selecting a denomination amount (e.g., $0.05, $0.25, etc), a wager amount (e.g., 1 credit, 3 credits, 5 credits, etc.) and a number of pay line(s) via the player control panel 44 or a touch screen, the player can begin slot game play.

Figure 2:
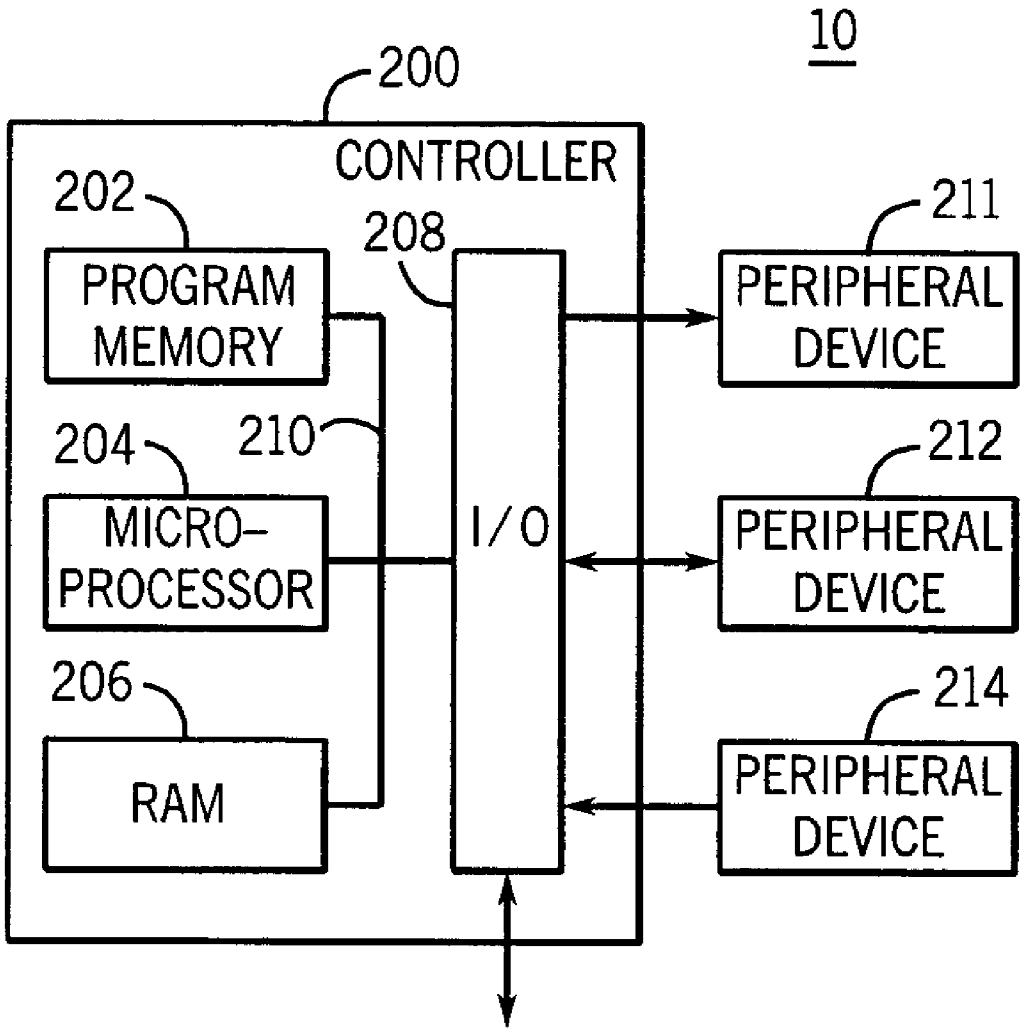
FIG. 2 is a block diagram of the electronic components of the gaming machine of FIG. 1.

FIG. 2 is a block diagram of a number of components that may be incorporated in the gaming machine 10. Referring to FIG. 2, the gaming machine 10 includes a controller 200 that may comprise a program memory 202, a microcontroller-based platform or microprocessor (MP) 204, a random-access memory (RAM) 206 and an input/output (I/O) circuit 208, all of which may be interconnected via a communications link, or an address/data bus 210. The microprocessor 204 is capable of controlling the display of images, symbols and other indicia such as characters, people, places, things, and faces of cards to be displayed. The RAM 206 is capable of storing machine set-up data and event data (e.g., coins-in, coins-out, games played) or other data used or generated during game play. The program memory 202 is capable of storing program code which controls the gaming machine 10 so that game play can occur in accordance with applicable math models, game rules, and pay tables. Although the program memory is preferably implemented as a non-volatile read only memory (ROM), it could also be a flash or battery backed RAM in order for the program memory 202 to be updated by a coupled server or floor controller.

It should be appreciated that although only one microprocessor 204 is shown, the controller 200 may include multiple microprocessors 204. For example, the controller 200 may include one microprocessor for executing low level gaming functions and another processor for executing higher level game functions such as some communications, security, maintenance, etc. Similarly, the memory of the controller 200 may include multiple RAMs 206 and multiple program memories 202, depending on the requirements of the gaming machine 10. Although the I/O circuit 208 is shown as a single block, it should be appreciated that the I/O circuit 208 may include a number of different types of I/O circuits and may be coupled to other I/O circuits. The RAM(s) 206 and program memory(s) 202 may be implemented as semiconductor memories, magnetically readable memories, and/or optically readable memories, etc. Further, the term "controller" is used herein to refer collectively to the program memory 202, the microprocessor 204, the RAM 206 and the I/O circuit 208.

FIG. 2 illustrates that multiple peripheral devices, depicted as peripheral devices 211, 212, and 214, may be operatively coupled to the I/O circuit 208. The peripheral devices may include a control panel with buttons, a coin slot acceptor, a note acceptor, a bill validator, a card reader, a keypad, a sound circuit driving speakers, a card reader display, a video display, a touch screen, a mechanical wheel, mechanical dice, etc. Although three peripheral devices are depicted, more or less peripheral devices may be included.

It should be appreciated that although the controller 200 is a preferable implementation of the present invention, the present invention also includes implementation via one or more application specific integrated circuits (ASICs), field programmable gate arrays (FPGAs), adaptable computing integrated circuits, one or more hardwired devices, or one or more mechanical devices. Furthermore, although the controller 200 preferably resides in the gaming machine 10, the present invention includes providing some or all of its functions at another location such as a server coupled to the gaming machine 10.

Figure 3:
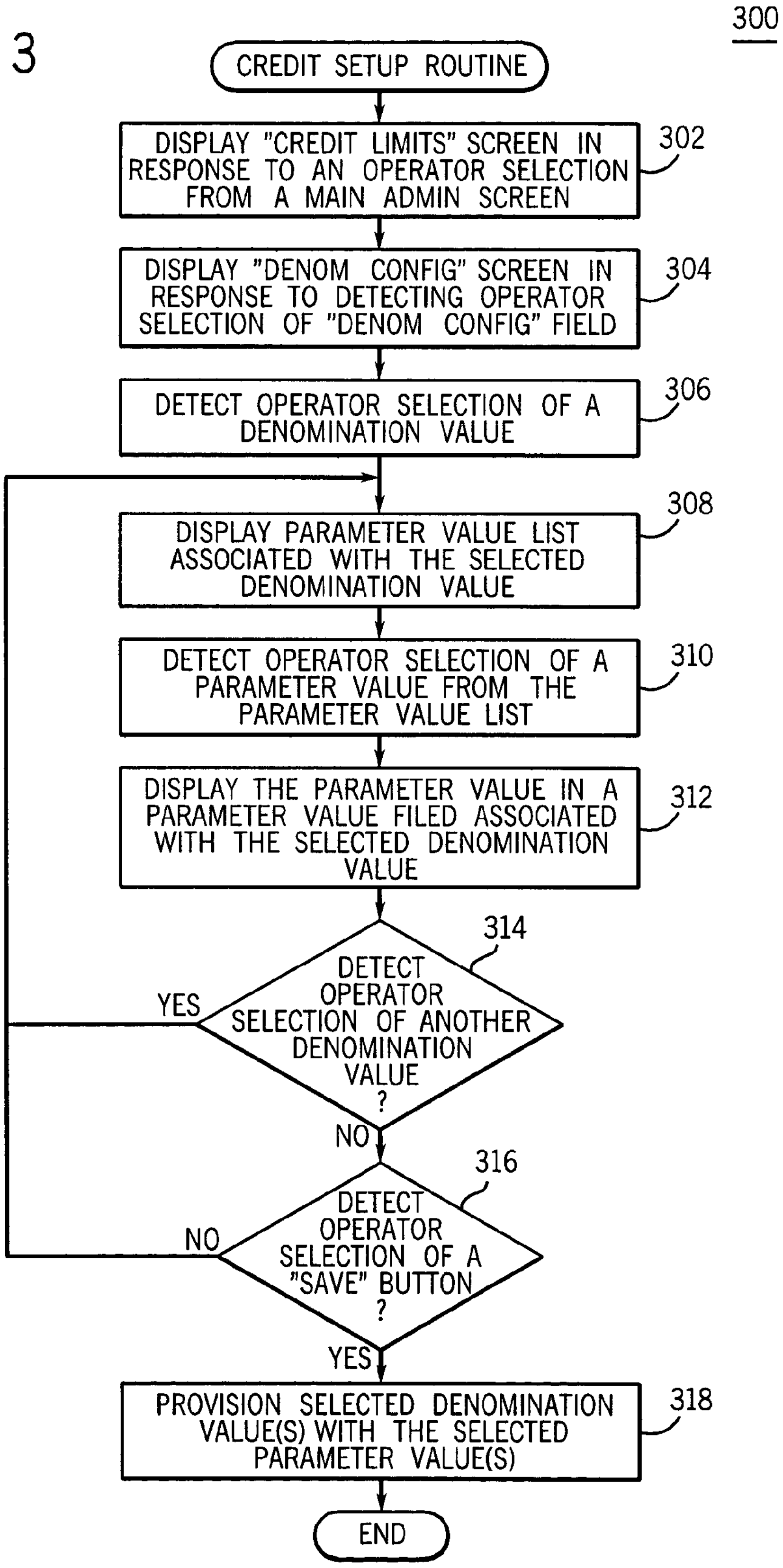
FIG. 3 is a flowchart of a credit setup routine for configuring the gaming machine of FIG. 1 during gaming machine set-up in accordance with the invention.

One manner in which the gaming machine 10 may operate is described below in connection with a flowchart, FIG. 3, which represents a number of portions or routines of one or more computer programs which may be stored in one or more of the memories of the controller 200. The computer program(s) or portions thereof may also be stored remotely outside of the gaming machine 10 and may therefore control the operation from a remote location.

As previously mentioned, prior art methods for single-themed gaming machine setup do not allow an operator to select different maximum pay line values for each of the different game denomination values. Similarly, prior art methods for multi-themed gaming machine setup do not allow an operator to select different maximum pay line values for the different game denomination values within each of the singe themes of the multi-themed game. Indeed, prior art methods restrict operator selection to the same maximum pay line value for each different game denomination value offered by the single-themed gaming machine, or to the same maximum pay line value for each different game denomination value within each of the single themes offered by the multi-themed gaming machine.

In addition, the prior art methods for gaming machine setup do not provide operator selectable parameter values or parameter value combinations (e.g., a combination of a maximum pay line value with an associated payback percentage) that have been limited to include only those values which have been determined by the manufacturer to provide optimal game play. Thus prior art methods for gaming machine setup may allow improper operator selection of parameter values which then give rise to a poor game play experience for the player and therefore yield lower revenues for the operator.

In accordance with the invention, the gaming machine 10 is configured with parameter values or parameter value combinations determined by the gaming machine manufacturer to provide optimum game play. The "manufacturer-limited" parameter values or parameter value combinations are operator selectable during gaming machine setup via setup options displayed on an admin touch screen of the gaming machine 10 (or a coupled server if a server-based gaming network is utilized). Although a number of setup options are available during gaming machine setup (e.g., touch screen setup, sound setup, machine setup, clock setup, communication setup, etc.), operator selection of the manufacturer-limited parameters or parameter combinations is preferably accomplished via selection of a credit setup option. Selection of the credit setup option enables the operator to (1) select a base denomination value, (2) initiate multi denomination selection, and (3) select and provision each of the denominations of the multi denomination selections with one of a number of manufacturer-limited parameter values or parameter value combinations associated with the selected denomination. Each of the parameter values or parameter value combinations preferably includes one of a number of different maximum pay line configurations and one of a number of different payback percentages. As a result, the maximum pay line configurations available to a player can vary within a single-themed game or within single themes of a multi-themed game. In addition, the operator can configure the gaming machine to generate the same payback percentage over time, even when different mathematical models are utilized by, for example, selecting different maximum pay line values, different probability tables, or other math parameter values during gaming machine setup.

Selection of the credit setup option by the operator also invokes performance of a credit setup routine 300 by the controller 200. FIG. 3 is a flowchart of the credit setup routine 300 that may be performed during gaming machine setup. In response to operator selections via an admin touch screen, the controller 200 causes the manufacturer-limited parameter values or parameter value combinations to be displayed to the operator. The controller 200 also configures the game in response to subsequent operator selection of the parameter values or parameter value combinations.

Figure 4:
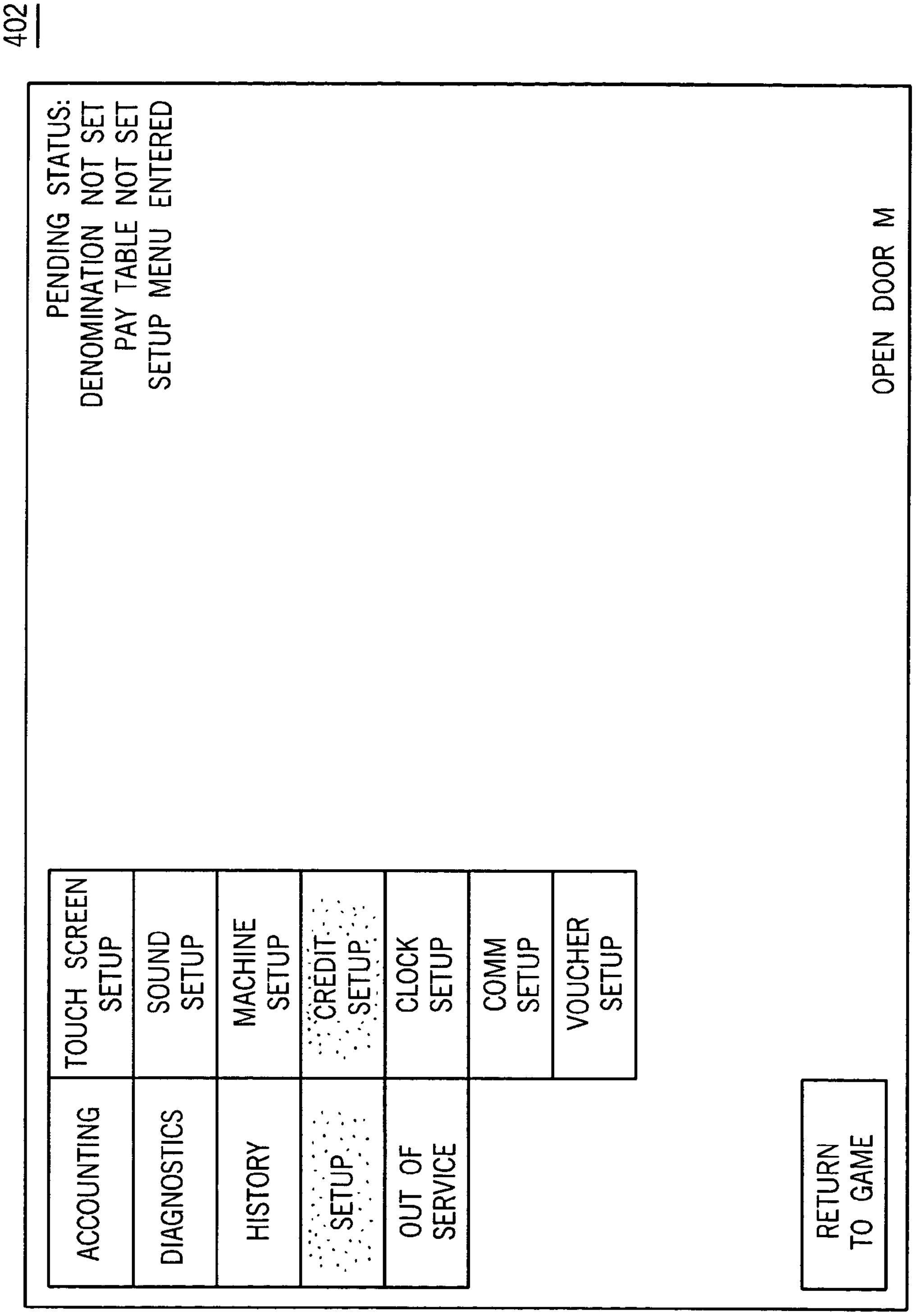
FIGS. 4-14 are a series of exemplary screen shots that may be displayed on the gaming machine of FIG. 1 during operator selection of the manufacturer-limited parameter values in accordance with the invention.
Figure 5:
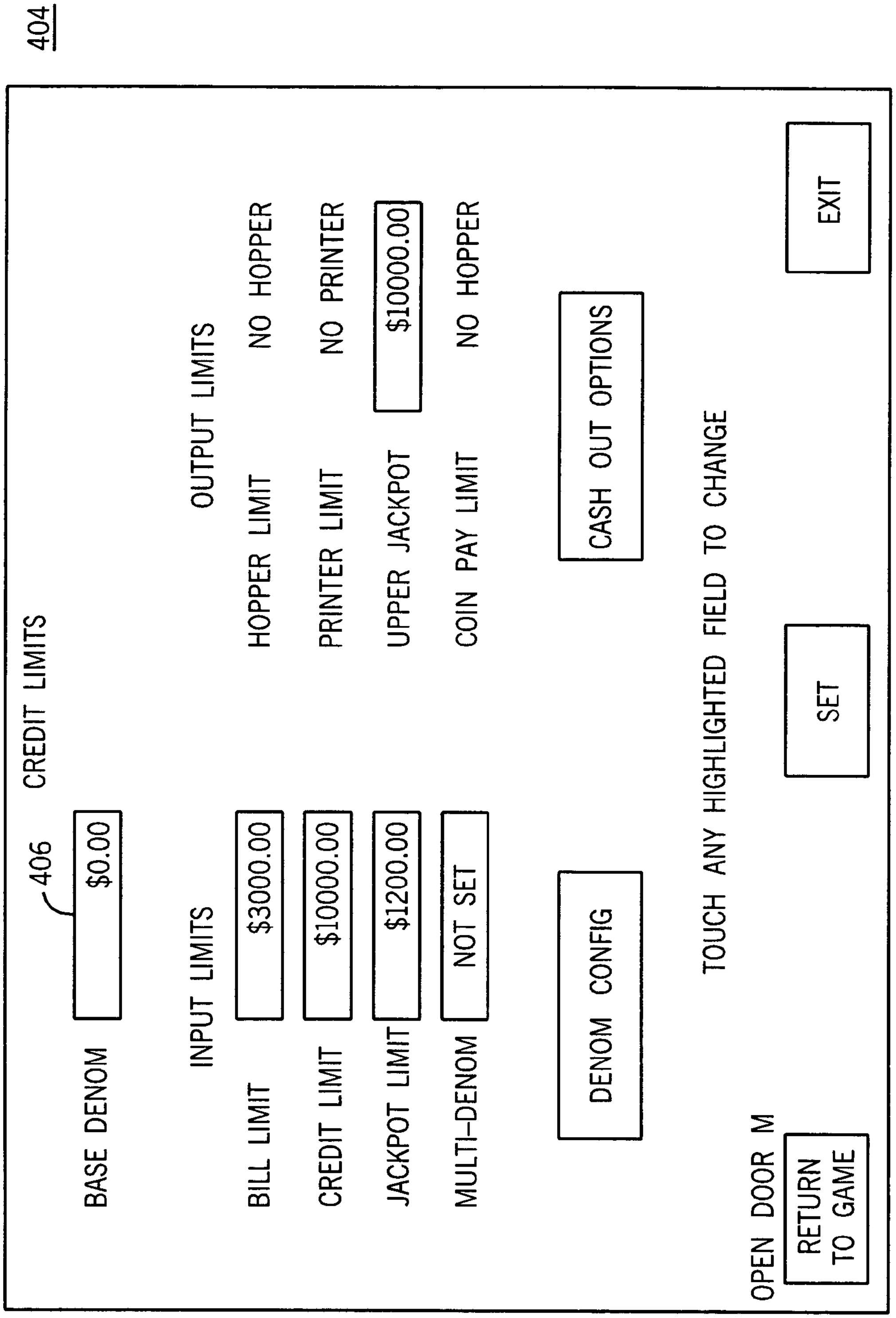
Figure 6:
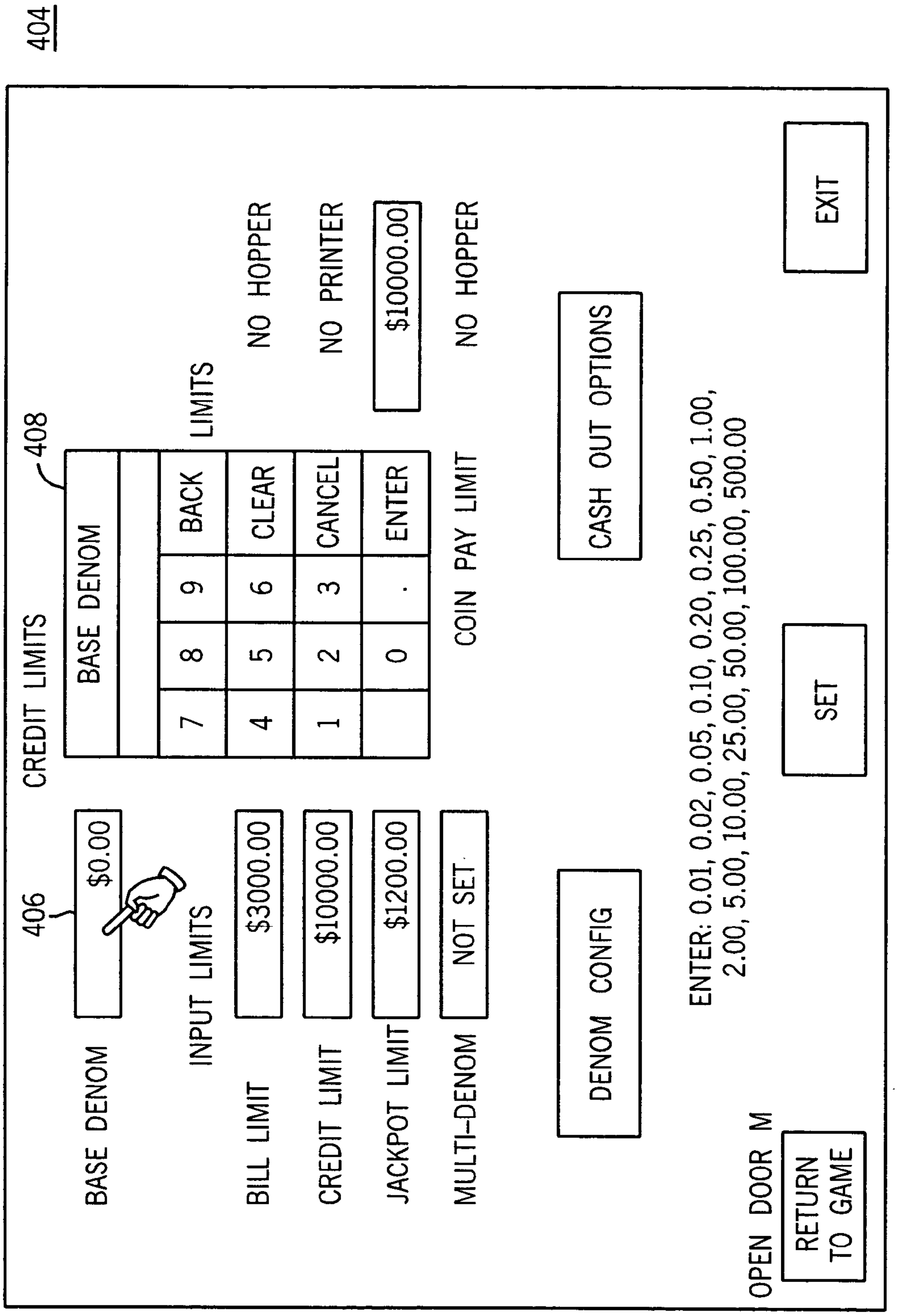
Figure 7:
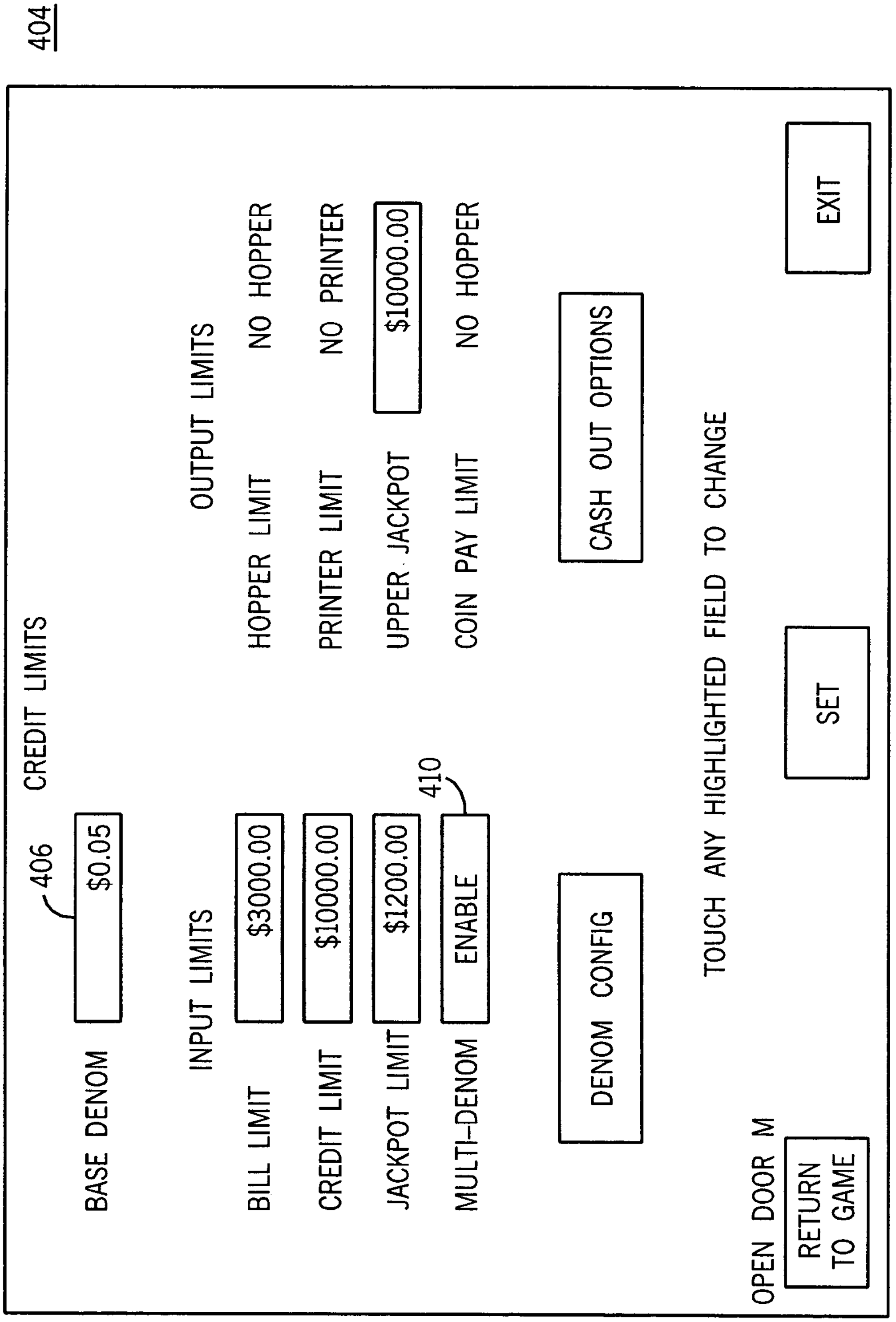

For example, FIGS. 4-14 are a series of exemplary screen shots that may be displayed during performance of the credit setup routine 300. Referring to FIGS. 3 and 4, in response to operator selection of a "setup" button and the "credit setup" button on a main admin screen 402, the controller 200 causes a "Credit Limits" screen 404 (shown in FIG. 5) to be displayed (step 302). The Credit Limits screen 404 is configured with a number of selectable fields to enable operator input of monetary input limit values (e.g., a bill limit, a credit limit, a jackpot limit) and monetary output limit values (e.g. a hopper limit, a printer limit, an upper jackpot, and a coin pay limit) for the gaming machine 10. The Credit Limits screen 404 is also configured with a "Base Denom" field 406 to enable the operator to input a base denomination value for subsequent game play. When the Base Denom field 406 is selected by the operator (FIG. 6), the controller 200 causes a pop-up numerical touch screen 408 to be displayed on the credit limits screen. Using the numerical touch screen 408, the operator selects a base denomination value for gaming machine play. The base denomination values available for gaming machine setup are displayed at the bottom of the Credit Limits screen 404. In the illustrated example, the operator selects a base denomination value of $0.05. After operator selection of the base denomination value followed by selection of the "enter" button on the numerical touch screen 408, the controller 200 causes the credit limits screen 404 to display the selected base denomination value (e.g., $0.05) in the Base Denom field 406 (FIG. 7). The controller 200 also causes an appearance change to the Base Denom field 406 indicating the completion. Additionally, the controller 200 causes a status change of a Multi-denom field 410 from "Not Set" to "Enabled" (FIG. 7).

Figure 8:
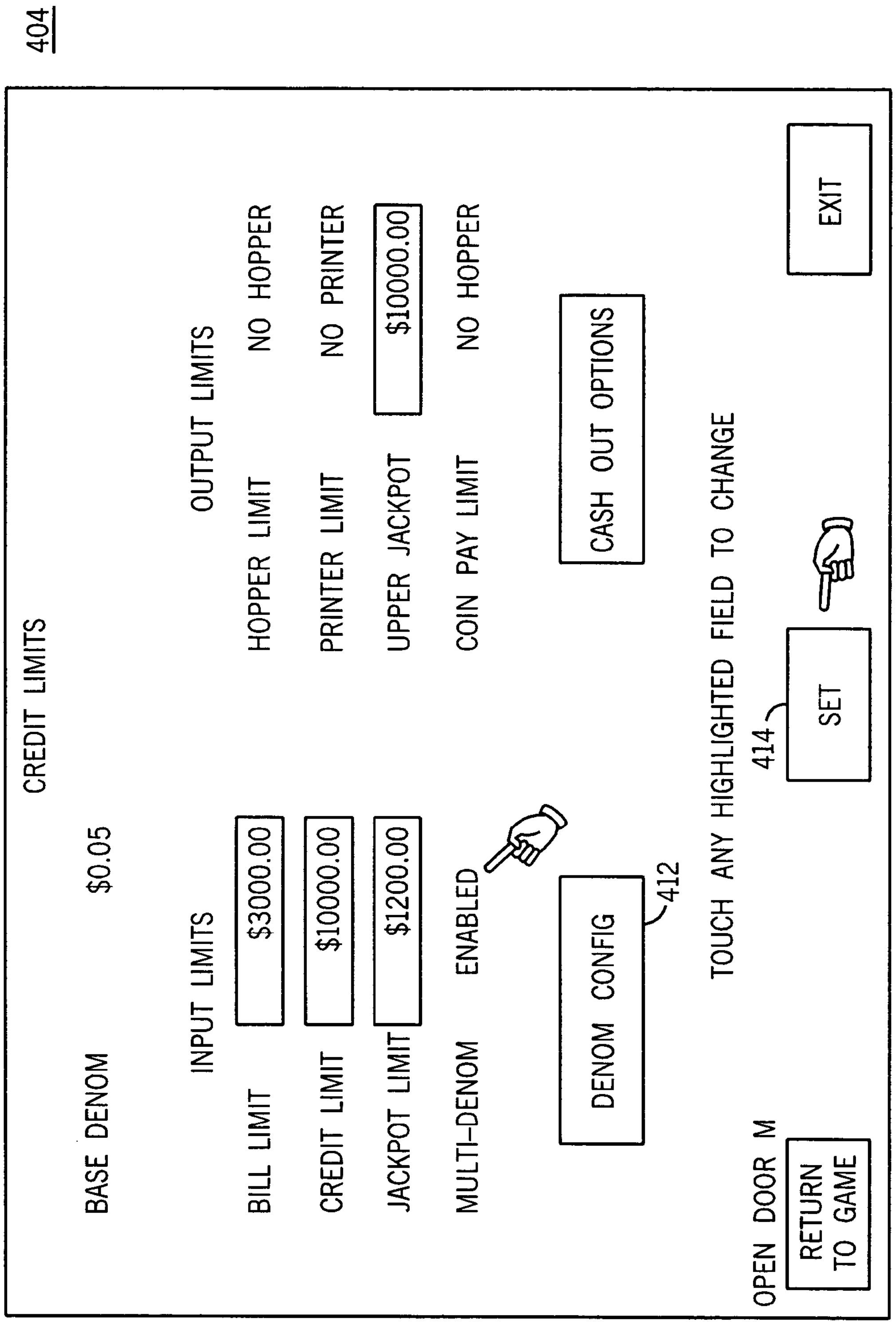
Figure 9:
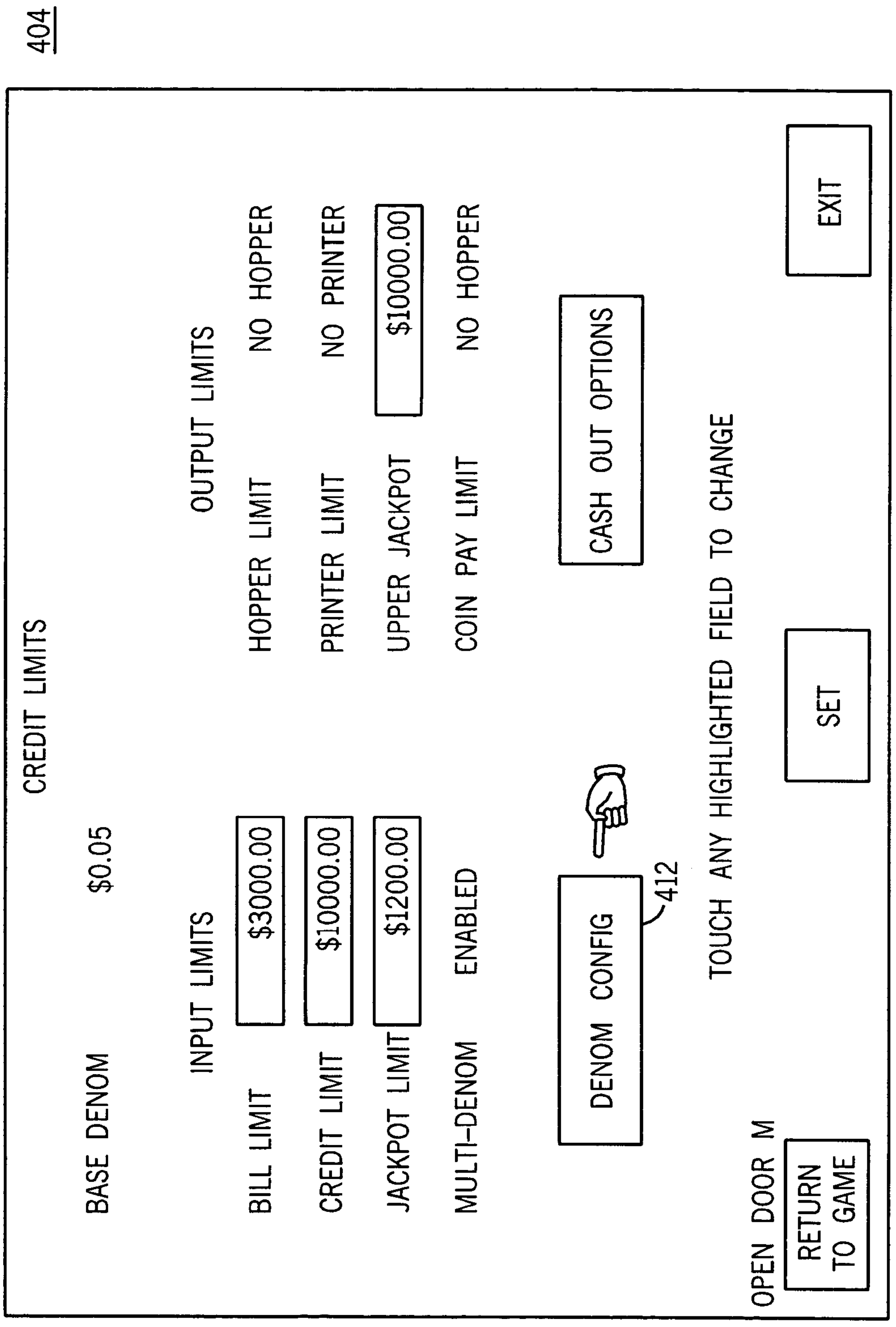

Upon selection of the Multi-denom field 410 and selection of a "Set" button 414 by the operator, the controller 200 permanently configures the base denomination value such that subsequent changes to the base denomination value would require another RAM clear (FIG. 8). The controller 200 also enables operator selection of a Denom Config field 412, indicating to the operator that multiple denomination values may be selected and provisioned as follows.

Figure 10:
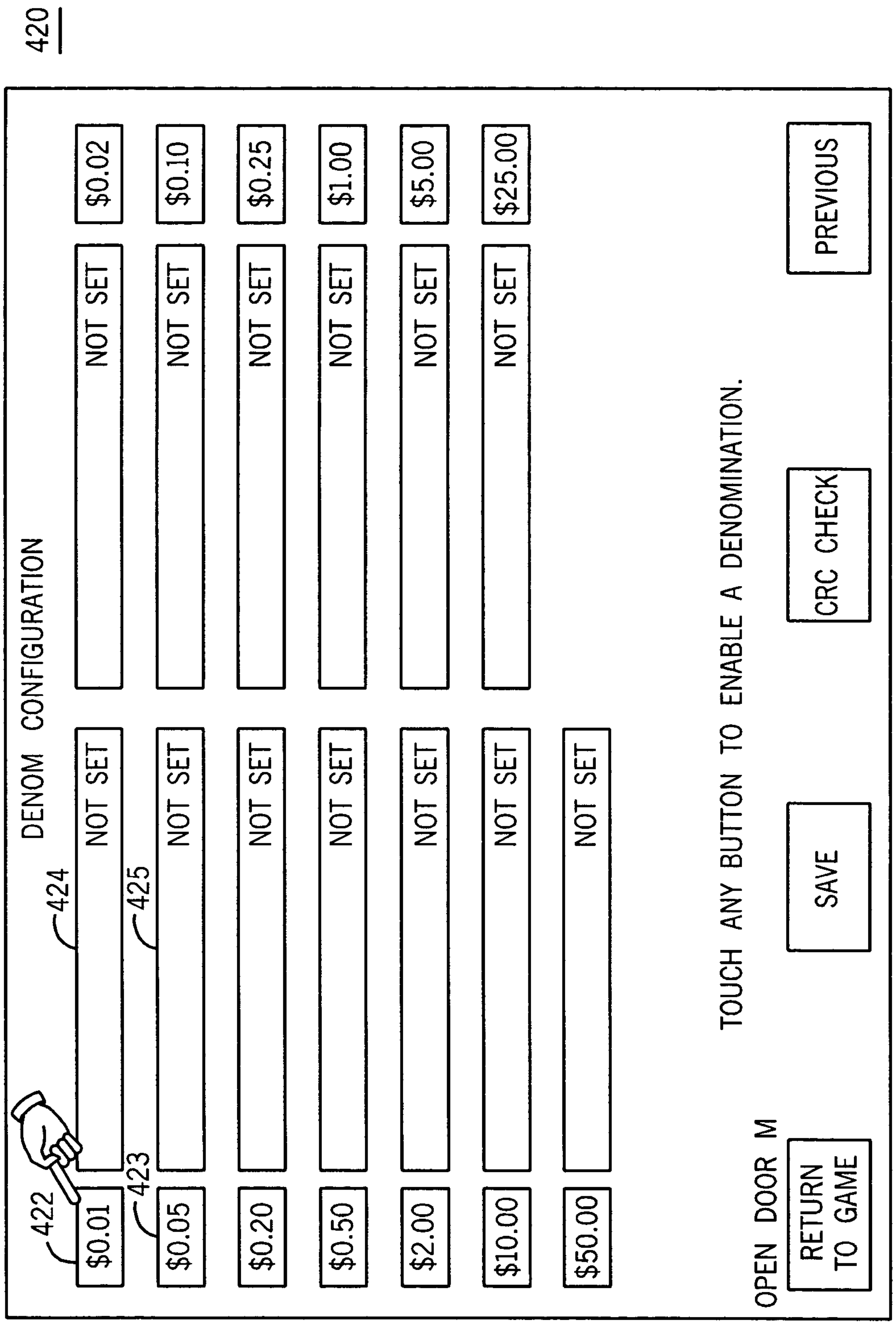

Upon detecting selection of the Denom Config field 412 (FIG. 9), the controller 200 causes a "Denom Configuration" screen 420 to be displayed (step 304) to the operator (FIG. 10). The Denom Config screen 420 includes a list of different denomination values (e.g., a $0.01 denomination 422, a $0.05 denomination 423). Each of the different denomination values has an associated parameter value field (e.g., $0.01 parameter value field 424, $0.05 parameter value field 425). Prior to provisioning their associated denomination values, each of the parameter value fields displays a status of "Not Set".

Figure 11:
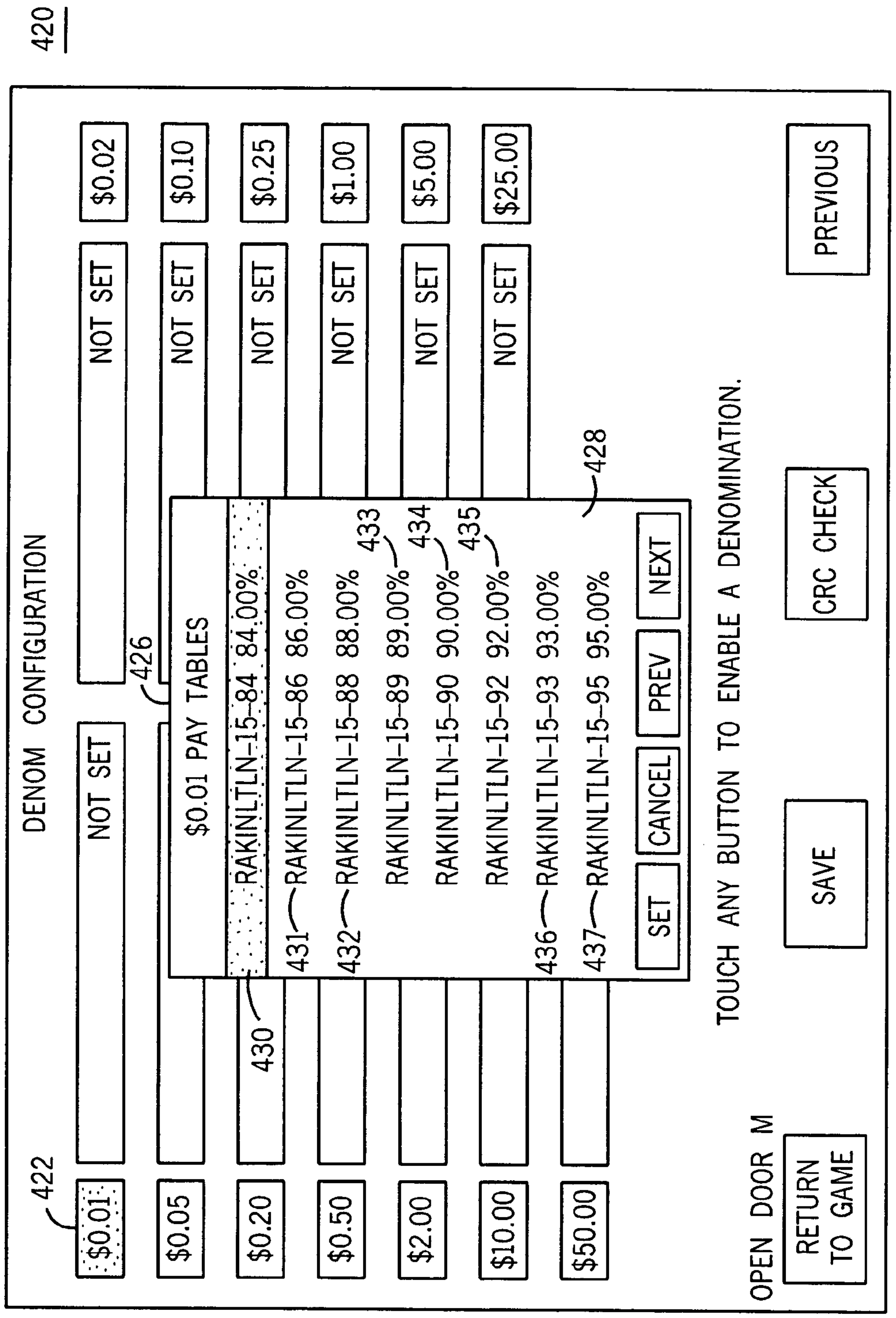

Upon detecting selection of a denomination value (step 306), for example selection of the $0.01 denomination 422, the controller 200 causes a pop-up parameter screen 426 to be displayed (step 308) to the operator (FIG. 11). The parameter screen 426 includes a limited parameter value list 428 of operator selectable parameter values or parameter value combinations available for the selected denomination value. The limited parameter value list 428 therefore represents a manufacturer-selected list of optimal parameter values associated with game play utilizing the $0.01 denomination. As illustrated in FIG. 11, each entry 430-437 of the limited parameter value list 428 includes a maximum pay line value and an associated payback percentage value for the selected denomination value. In another example, the limited parameter value list 428 may include only payback percentage values or other suitable parameter values.

As mentioned above, the limited parameter value list 428 is limited to parameter values or parameter value combinations which have been determined to be most favorable in combination with the selected denomination value based on market research and player feedback. This prevents the operator from incorrectly provisioning the denomination values with non-optimum pay line values, payback percentage values, etc.

Figure 12:
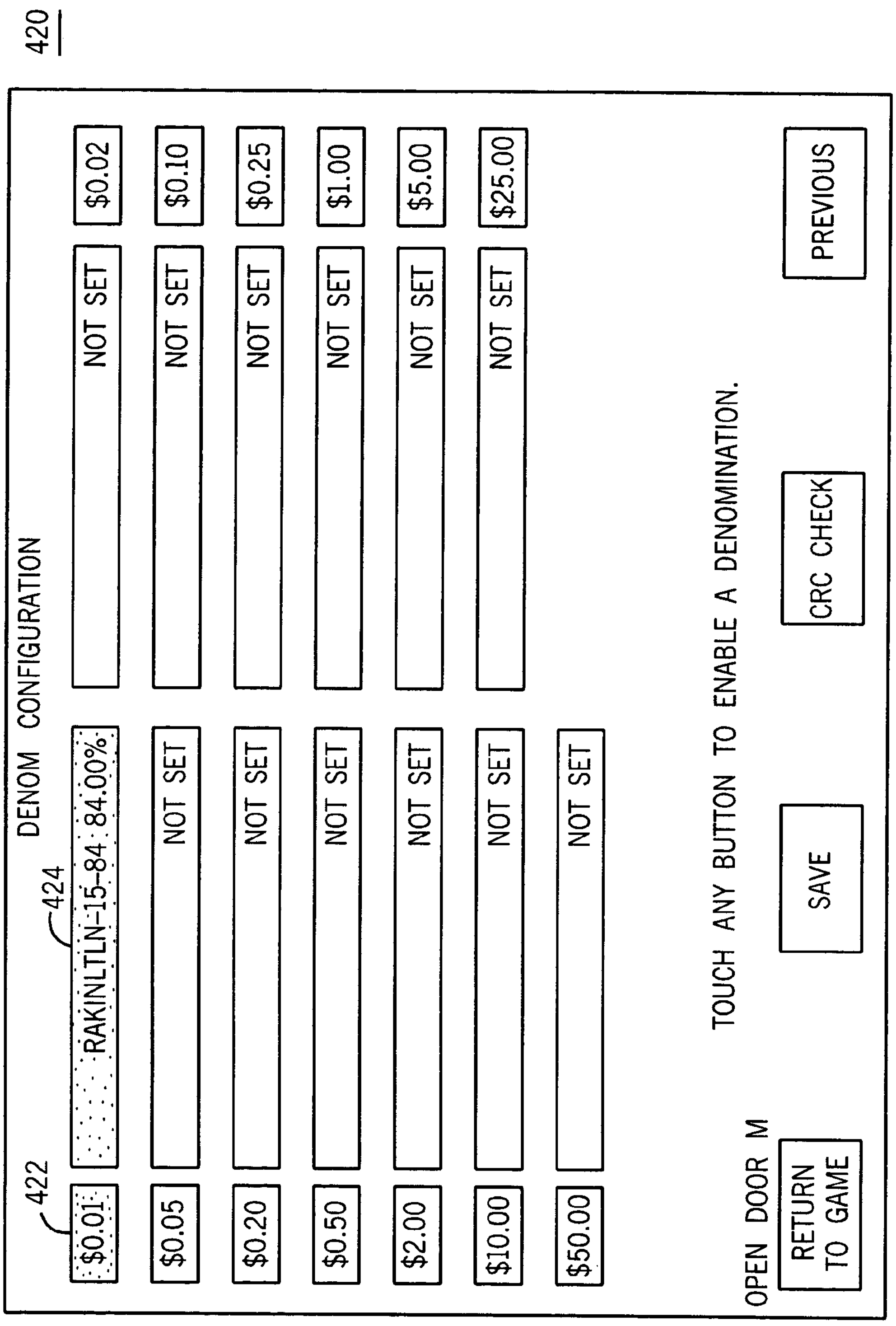

Next, in response to detecting selection of an entry (step 310) from the limited parameter value list 428, for example selection of entry 430, the controller 200 causes the parameter value reflected in the entry 430 to be displayed (step 312) in the $0.01 parameter value field 424 (FIG. 12). For example, in the illustrated example, in response to operator selection of the entry 430, the controller 200 causes a maximum pay line value of 15 and a payback percentage value of 84% to be displayed in the $0.01 parameter value field 424 indicating that the maximum number of pay lines during $0.01 denomination game play is 15 and that 84% of the value input into the gaming machine will, on average over the long run, be paid out to the various players of gaming machine 10.

Figure 13:
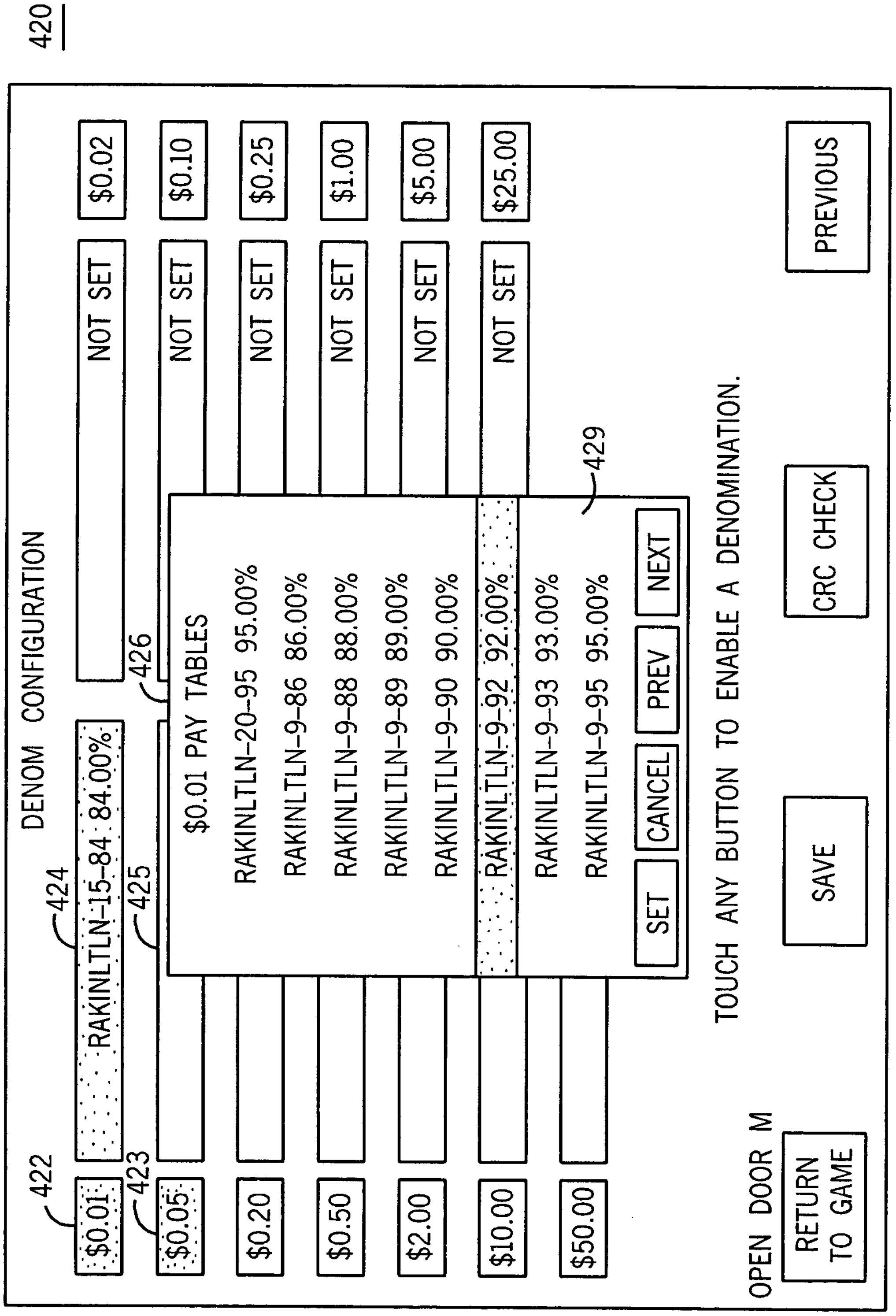
Figure 14:
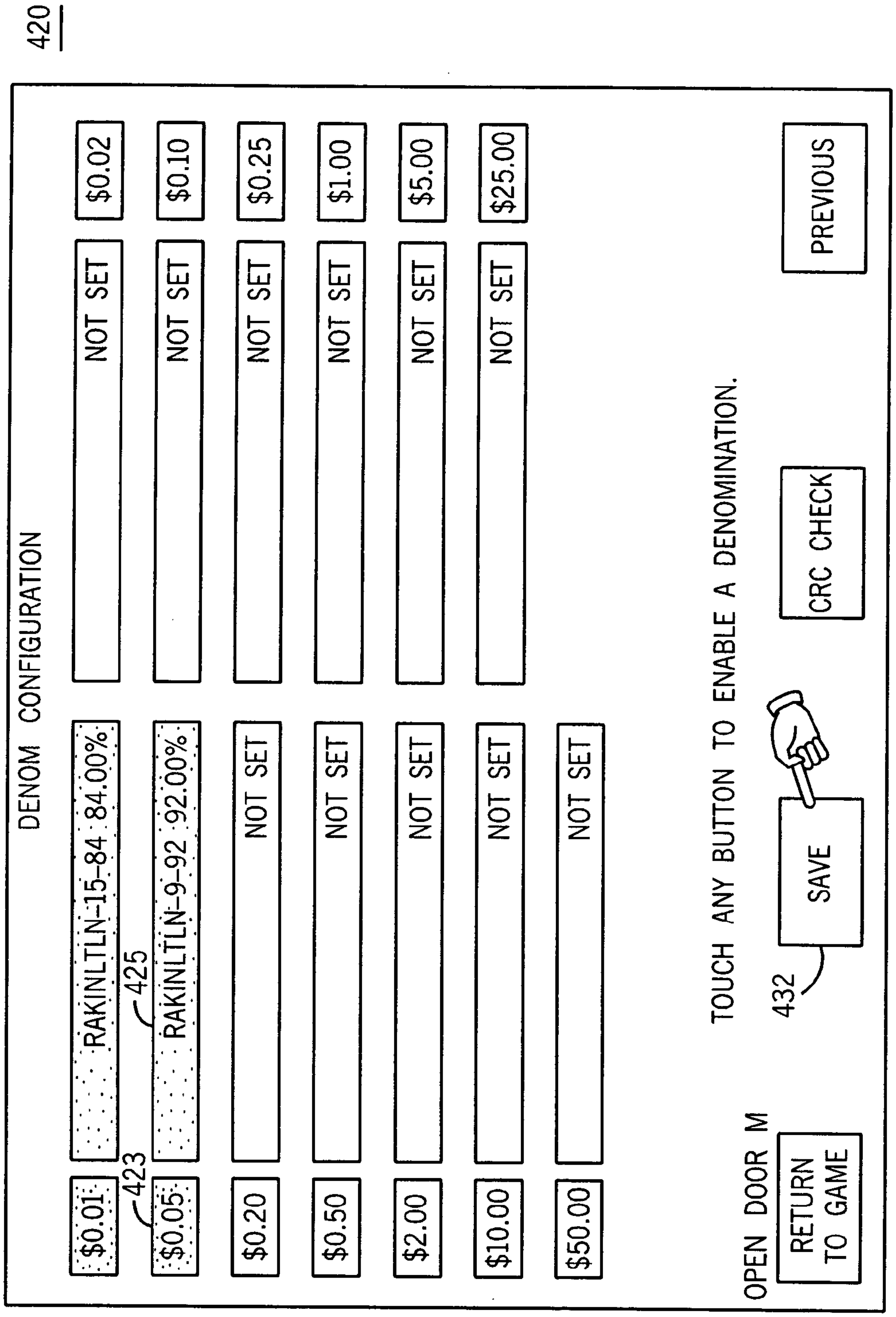

Similarly, the operator may provision additional denomination values (step 314) (therefore repeating steps 308, 310, and 312) with different parameter values. As shown in FIG. 13, the limited parameter value list 429 displayed as a result of operator selection of the $0.05 parameter denomination 423 differs from the limited parameter value list 428 associated with the $0.01 parameter denomination 422 shown in FIG. 11. For example, the pop-up parameter screen 426 of FIG. 11 allows operator selection from among parameter value combinations having a 15 maximum pay line value with different payback percentages. In contrast, the pop-up parameter screen 426 of FIG. 13 allows operator selection from among parameter values combinations having (1) a 20 maximum pay line value with a pay out percentage of 95%, or (2) a 9 maximum pay line value with different payback percentages. Thus, the parameter values, including the maximum pay lines, can vary within the individual pop-up parameter screen 426 associated with a denomination, and can vary between the individual pop-up parameter screens 426 associated with all selectable denominations. In this way, the manufacturer optimizes game play by limiting operator selections to parameter values to those available via the pop-up parameter screen 426. In addition, the maximum pay line configurations available to a player can vary within a single-themed game or within single themes of a multi-themed game, thereby enabling a varied gaming experience for the player.

In response to detecting selection (step 316) of the "Save" button 432 (FIG. 14), the controller 200 causes a "yes and no" prompt to be displayed to the operator. If the operator selects the yes prompt, parameter values or parameter value combinations selected by the operator are permanently saved by the controller 200 and cannot be changed unless another RAM clear is performed. The associated game denominations are therefore provisioned (step 318). If the operator selects the no prompt, the operator has another opportunity to modify parameter values or parameter value combinations selection. Therefore, once provisioned and saved by the operator, the selected denominations and associated pay table options are permanent until another RAM clear is performed.

Figure 15:
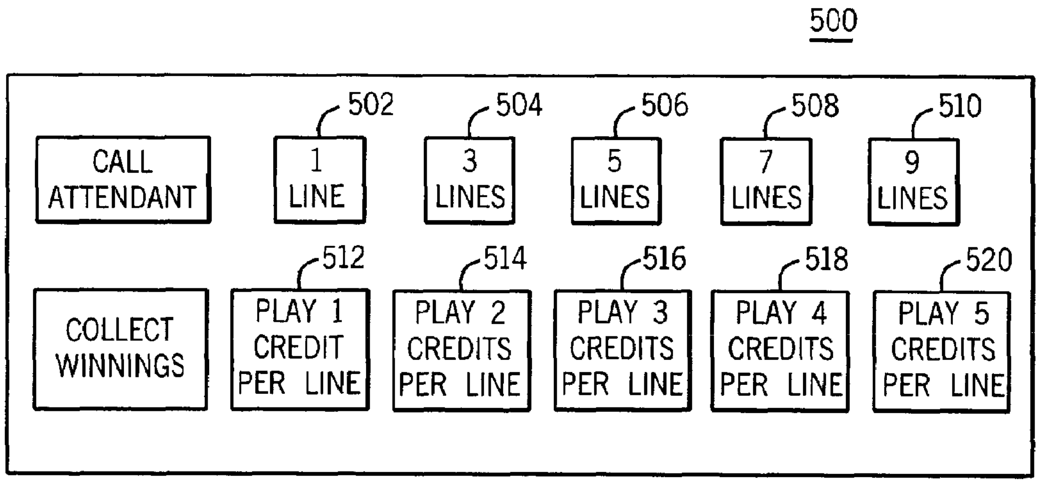
FIG. 15 is an exemplary traditional player control panel.

Enabling the operator to select parameter values or parameter value combinations at the time of gaming machine setup necessitates alignment of the pre-configured mechanical buttons on the player control panel 44 with the operator's parameter values or parameter value combination selections (e.g., the maximum pay line). Unfortunately, mechanical buttons provided on prior art player control panels are configured to accommodate a single maximum pay line configuration and not multiple maximum pay line configurations such as those provided in accordance with an embodiment of the invention. For example, FIG. 15 is a traditional gaming machine player control panel 500 (i.e., a mechanical button panel) configured with player selectable pay line configuration that include a "1 line" button 502, a "3 line" button 504, "a 5 line" button 506, a "7 line" button 508, and a "9 line" button 510 to accommodate a slot game having one, three, five, seven or nine available pay line configurations. There is only one maximum pay line available for game play; in this case, 9 maximum pay lines. Similarly, the traditional gaming machine player control panel is configured with a "play 1 credit per line" button 512, a play 3 credits per line" button 514, "a play 5 credits per line" button 516, a "play 7 credits per line" button 518, and a "play 9 credits per line" button 520. Therefore in the case of the traditional player control panel 500 of FIG. 15, an operator would not have an option to setup the slot machine with a single-themed game having a maximum number of pay lines equivalent to 20.

Figure 16:
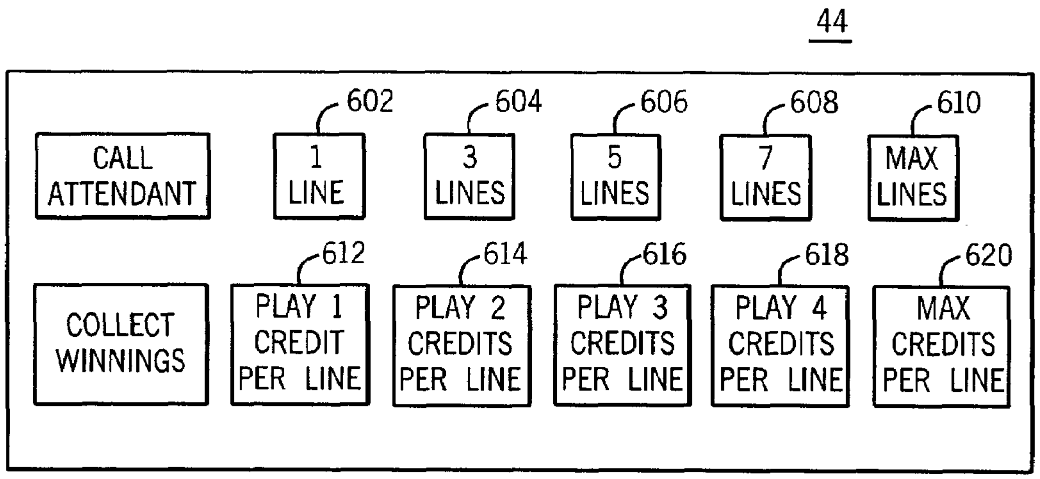
FIG. 16 is a more detailed view of the player control panel of the gaming machine of FIG. 1.

In accordance with an embodiment of the invention, the player control panel 44 is configured with the "Max Pay Line" button and a "Max Credits Per Line" button to accommodate operator selection of varied maximum pay line values and payback percentage values displayed on the pop-up parameter screen 426. FIG. 16 is a more detailed view of the player control 44 of the gaming machine 10. The player control panel 44 having a "1 line" button 602, a "3 line" button 604, "a 5 line" button 606, a "7 line" button 608, and a "Max line" button 610 is configured to accommodate operator selection of the different manufacturer-limited parameter values and/or parameter value combinations during the gaming machine setup as described in connection with FIGS. 3-14. Thus because the "Max Lines" button 610 can represent different maximum pay line values for a single-themed game having multiple denominations, it allows the operator to choose from among any of the parameter values (including the maximum pay line values) displayed via the pop-up parameter screen 426 when provisioning selected denominations. Similarly, because the "Max Credits per Line" button 620 can represent different maximum credits per pay line for a single-themed game having multiple denominations, it allows the operator to choose from among any of the parameter values (that may include payback percentages, maximum credits per line, or other mathematical parameters) displayed via the pop-up parameter screen 426 when provisioning selected denominations. In other words, the operator is not limited to choosing one maximum pay line value and one maximum credit value for a single-themed game as is required in the prior art methods.

As may be apparent from the discussion above, the gaming machine having manufacturer-limited parameter values selectable by an operator during a single-themed gaming machine set-up enables the operator to select from among different maximum pay line configurations and payback percentages determined to provide optimum game play for a selected game denomination. The gaming machine having manufacturer-limited parameter values selectable by an operator also provides player selectable mechanical buttons on the gaming machine that correspond to the selected maximum pay line configurations and payback percentages where the selected maximum pay line configurations and payback percentages vary between the different game denominations. In this way, operator efficiency during gaming machine setup is increased, game play is optimized for each denomination value, player satisfaction is increased, and revenues for the gaming machine operator are increased.

From the foregoing, it will be observed that numerous variations and modifications may be affected without departing from the scope of the novel concept of the invention. It is to be understood that no limitations with respect to the specific methods and apparatus illustrated herein is intended or should be inferred. It is, of course, intended to cover by the appended claims all such modifications as fall within the scope of the claims.

It is claimed:

1. A method for configuring a gaming machine via an interactive configuration screen, the method comprising:

displaying a first plurality of a maximum number of pay lines for a single game theme;

detecting operator selection of a maximum number of pay lines from the first plurality of the maximum number of pay lines;

displaying a second plurality of a maximum number of pay lines for the single game theme responsive to the operator selection from the first plurality of the maximum number of pay lines, the second plurality of the maximum number of pay lines being different than the first plurality of the maximum number of a lines;

detecting operator selection of a maximum number of pay lines from the second plurality of the maximum number of pay lines; and configuring game play of the gaming machine based on the maximum number of pay lines selected from each of the first plurality of the maximum number of pay lines and the second plurality of the maximum number of pay lines.

2. The method of claim 1, wherein the first plurality of the maximum number of pay lines is displayed in response to operator selection of a first denomination value from a plurality of denomination values displayed on the interactive configuration screen.

3. The method of claim 2, wherein the second plurality of the maximum number of pay lines is displayed in response to operator selection of a second denomination value from the plurality of denomination values displayed on the interactive configuration screen.

4. The method of claim 3, further comprising:

detecting selection of a save indication displayed on the interactive configuration screen;

causing a player selectable mechanical button of the gaming machine to correspond to the selected maximum number of pay lines from the first maximum number of pay lines during game play utilizing the first denomination value; and causing the player selectable mechanical button to correspond to the selected maximum number of pay lines from the second maximum number of pay lines during game play utilizing the second denomination value.

5. The method of claim 3, wherein each of the first plurality of the maximum number of pay lines is determined by a manufacturer of the gaming machine to provide optimum game play by a player utilizing the first denomination value, and wherein each of the second plurality of the maximum number of pay lines is determined by the manufacturer of the gaming machine to provide optimum game play by a player utilizing the second denomination value.

6. A method for operator selection of manufacturer-limited game configuration values for single-themed game play on a gaming machine, the gaming machine including a video display for displaying an interactive configuration screen, the method comprising:

detecting operator selection of a first game denomination value from a plurality of game denomination values displayed on the interactive configuration screen;

in response to detecting operator selection of the first game denomination value, displaying a first plurality of different manufacturer-limited game configuration values;

detecting operator selection of a first manufacturer-limited game configuration value from the first plurality of different manufacturer-limited game configuration values;

detecting operator selection of a second game denomination value from the plurality of game denomination values;

in response to detecting operator selection of the second game denomination value, displaying a second plurality of different manufacturer-limited game configuration values different than said first plurality of different manufacturer-limited game configuration values;

detecting selection of a second manufacturer-limited game configuration value from the second plurality of different manufacturer-limited game configuration values; and configuring game play based on the first manufacturer-limited game configuration value and based on the second manufacturer-limited game configuration value.

7. The method of claim 6, wherein each of the first plurality of different manufacturer-limited game configuration values comprises a maximum pay line value and a payback percentage, and wherein each of the second plurality of different manufacturer-limited game configuration values comprises a maximum pay line value and a payback percentage.

8. The method of claim 7, wherein at least two of the maximum pay line values of the first plurality are different, and wherein at least two of the maximum pay line values of the second plurality are different, and wherein the first manufacturer-limited game configuration value is substantially different from the second manufacturer-limited game configuration value.

9. The method of claim 7, further comprising:

detecting selection of a save indication displayed on the interactive configuration screen;

causing a first player selectable mechanical button of the gaming machine to correspond to a first maximum pay line value associated with the first manufacturer-limited game configuration value during single-themed game play utilizing the first game denomination value;

causing the first player selectable mechanical button to correspond to a second maximum pay line value associated with the second manufacturer-limited game configuration value during single-themed game play utilizing the second game denomination value;

causing a second player selectable mechanical button of the gaming machine to correspond to a first maximum credits per line value associated with the first manufacturer-limited game configuration value during single-themed game play utilizing the first game denomination value;

causing the second player selectable mechanical button to correspond to a second maximum credits per line value associated with the second manufacturer-limited game configuration value during single-themed game play utilizing the second game denomination value;

causing the gaming machine to pay out a first payback percentage associated with the first manufacturer-limited game configuration value during single-themed game play utilizing the first game denomination value; and causing the gaming machine to pay out a second payback percentage associated with the second manufacturer-limited game configuration value during single-themed game play utilizing the second game denomination value.

10. The method of claim 6, wherein each of the first plurality of different manufacturer-limited game configuration values is determined by a manufacturer of the gaming machine to provide optimum single-themed game play utilizing the first game denomination value, and wherein each of the second plurality of different manufacturer-limited game configuration values is determined by the manufacturer to provide optimum single-themed game play utilizing the second game denomination value.

11. A gaming machine for single theme game play comprising:

a video display;

a plurality of mechanical buttons selectable by a player during game play; and a controller operatively coupled to the video display and the plurality of mechanical buttons, the controller comprising a processor and a memory coupled to the processor, the controller being programmed to:

display a first plurality of a maximum number of pay lines on the video display, detect operator selection of a maximum number of pay lines from the first plurality of the maximum number of pay lines, display a second plurality of a maximum number of pay lines on the video display responsive to the selection from the first plurality of the maximum number of pay lines, the second plurality of the maximum number of pay lines being different than the first plurality of the maximum number of pay lines, detect operator selection of a maximum number of pay lines from the second plurality of the maximum number of pay lines, and configure single theme game play of the gaming machine based on the maximum number of pay lines selected from each of the first plurality of the maximum number of pay lines and the second plurality of the maximum number of pay lines.

12. The gaming machine of claim 11, wherein the first plurality of the maximum number of pay lines is displayed in response to operator selection of a first denomination value from a plurality of denomination values displayed on the video display.

13. The gaming machine of claim 12, wherein the second plurality of the maximum number of pay lines is displayed in response to operator selection of a second denomination value from a plurality of denomination values displayed on the video display.

14. The gaming machine of claim 13, wherein the controller is further programmed to:

detect selection of a save indication displayed on the video display;

cause a mechanical button of the plurality of mechanical buttons to correspond to the selected maximum number of pay lines from the first plurality of the maximum number of pay lines during single theme game play utilizing the first denomination value; and cause the mechanical button to correspond to the selected maximum number of pay lines from the second plurality of the maximum number of pay lines during single theme game play utilizing the second denomination value.

15. The gaming machine of claim 13, wherein each of the first plurality of the maximum number of pay lines is determined by a manufacturer of the gaming machine to provide optimum game play by a player utilizing the first denomination value, and wherein each of the second plurality of the maximum number of pay lines is determined by the manufacturer of the gaming machine to provide optimum game play by the player utilizing the second denomination value.

16. The gaming machine of claim 11, wherein at least one of the second plurality of the maximum number of pay lines is different from at least one of the first plurality of the maximum number of pay lines.

* * * * *